United States Patent [19]

Iimori et al.

[11] Patent Number: 4,492,543
[45] Date of Patent: Jan. 8, 1985

[54] ORBITING MEMBER FLUID DISPLACEMENT APPARATUS WITH ROTATION PREVENTING MECHANISM

[75] Inventors: Takayuki Iimori; Kiyoshi Terauchi, both of Isesaki; Seiichi Sakamoto, Gunma, all of Japan

[73] Assignee: Sanden Corporation, Gunma, Japan

[21] Appl. No.: 356,647

[22] Filed: Mar. 9, 1982

[30] Foreign Application Priority Data

Mar. 9, 1981 [JP] Japan .................. 56-33644

[51] Int. Cl.³ .................. F01C 1/02; F01C 21/02; F16D 3/16; F16C 19/16
[52] U.S. Cl. .................. 418/55; 464/103; 464/139; 384/612
[58] Field of Search .................. 418/55, 57, 59; 464/102, 103, 139; 308/230, 233

[56] References Cited

U.S. PATENT DOCUMENTS

| 847,069 | 3/1907 | Hawkins | 308/230 |
| 4,160,629 | 7/1979 | Hidden et al. | 418/55 |
| 4,259,043 | 3/1981 | Hidden et al. | 418/55 |
| 4,303,379 | 12/1981 | Hiraga et al. | 418/55 |

FOREIGN PATENT DOCUMENTS

| 17886 | 6/1935 | Australia | 384/614 |
| 1960216 | 6/1971 | Fed. Rep. of Germany | 464/103 |
| 928465 | 6/1947 | France |  |
| 976187 | 10/1950 | France |  |

Primary Examiner—John J. Vrablik
Attorney, Agent, or Firm—Banner, Birch, McKie & Beckett

[57] ABSTRACT

A rotation preventing/thrust bearing device for use in an orbiting member fluid displacement apparatus is disclosed. The rotation preventing/thrust bearing device includes a discrete fixed portion, a discrete orbital portion and bearing elements. The fixed portion includes a fixed race and fixed ring both of which are formed separately. The fixed race is placed in a groove in an inner surface of the housing and the fixed ring is attached to the housing. The orbital portion includes an orbital race and an orbital ring both of which are formed separately. The orbital race is placed in a groove in an end plate of the orbiting member and the orbital ring is attached to the end plate of the orbiting member. A plurality of pockets are formed in the rings toward the respective races. The pockets of the rings face one another in generally aligned pairs. A bearing element is received in each aligned pair of pockets to prevent the rotation of the orbiting member by the bearing elements interacting with the orbital and fixed rings and to carry the axial thrust load from the orbiting member.

7 Claims, 8 Drawing Figures

ORBITING MEMBER FLUID DISPLACEMENT APPARATUS WITH ROTATION PREVENTING MECHANISM

BACKGROUND OF THE INVENTION

This invention relates to a rotary fluid displacement apparatus, and more particularly, to an improvement in a rotation preventing/thrust bearing device for an orbiting member fluid displacement apparatus.

There are several types of fluid apparatus which utilize an orbiting piston or fluid displacing member, such as a scroll, driven by a Scotch yoke type shaft coupled to an end surface of the piston or displacing member. One such apparatus, disclosed in U.S. Pat. No. 1,906,142 to John Ekelhof, is a rotary machine which has an annular and eccentrically movable piston adapted to act within an annular cylinder. The annular cylinder has a radial transverse wall. One end of wall the cylinder is fixedly mounted. Another wall is formed as a cover disc connected to the annular piston, and is driven by a crank shaft. Other prior art apparatus of this type is shown in U.S. Pat. Nos. 801,182 and 3,500,119. Though the present invention applies to either type of fluid apparatus, i.e., using either an annular piston or a scroll-type piston, description will be limited to a scroll type compressor. The term piston is used generically to describe a movable member of any suitable configuration within fluid displacement apparatus.

U.S. Pat. No. 801,182 (Creux) discloses a device including two scrolls each having a circular end plate and a spiroidal or involute spiral element. These scrolls are maintained angularly and radially offset so that both spiral elements interfit to make a plurality of line contacts between their spiral curved surfaces to thereby seal off and define at least one pair of fluid pockets. The relative orbital motion of the two scrolls shifts the line contacts along the spiral curved surfaces and, as a result, the volume of the fluid pockets changes. Since the volume of the fluid pockets increases or decreases dependent on the direction of the orbital motion, the scroll type fluid displacement apparatus is applicable to compress, expand or pump fluids.

Generally, in conventional scroll type fluid displacement apparatus, one scroll is fixed to a housing and the other scroll, which is the orbiting scroll, is eccentrically supported on a crank pin of a rotating shaft to cause the orbital motion. The scroll type fluid displacement apparatus also includes a rotation preventing device which prevents the rotation of the orbiting scroll to thereby maintain both scrolls in a predetermined angular relationship during operation of the apparatus.

Sealing along the line contacts of the above conventional scroll type apparatus must be maintained because the fluid pockets are defined by the line contacts between the two spiral elements and as the line contacts shift along the surface of the spiral elements, the fluid pockets change volume due to the orbital motion of the orbiting scroll. Since the orbiting scroll in such conventional scroll type apparatus is supported in a cantilever manner, an axial slant of the orbiting scroll occurs. Axial slant also occurs because the movement of the orbiting scroll is not rotary motion around the center of the orbiting scroll, but is orbiting motion caused by eccentric movement of a crank pin driven by the rotation of a drive shaft. Several problems result from the axial slant; such as, loss of sealing of the line contact, and vibration of the apparatus during operation and noise caused by physical striking of the spiral elements. One simple and direct solution to this problem is the use of a thrust bearing device for carrying the axial load. Thus, scroll type fluid displacement apparatus have been provided with rotation preventing and thrust bearing devices within their housing.

One recent attempt to improve rotation preventing and thrust bearing devices for scroll type fluid displacement apparatus is described in U.S. Pat. Nos. 4,160,629 (Hidden et al) and 4,259,043 (Hidden et al). The rotation preventing and thrust bearing devices in these U.S. patents are integral with one another. The rotation preventing/thrust bearing device described in these U.S. patents (see, e.g., FIG. 7 of Hidden et al. U.S. Pat. No. 4,259,043), comprises one set of indentations formed on the end surface of the circular plate of the orbiting scroll and a second set of indentations formed on an end surface of a fixed plate attached to the housing. A plurality of spheres are placed between facing indentations. However, the indentations are formed directly on the end surface of orbiting scroll or the fixed plate. The production of this type of mechanism is therefore very intricate.

Figure 1:
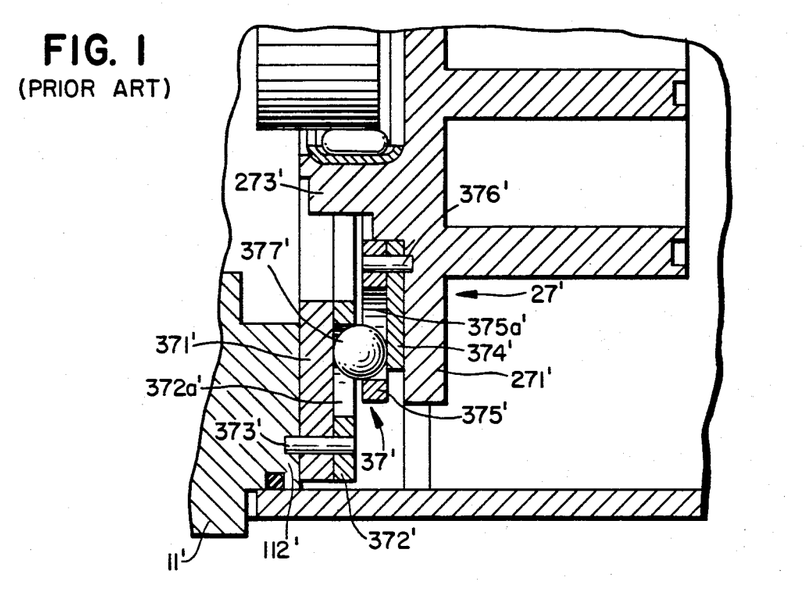
FIG. 1 is a vertical sectional view of a part of a compressor illustrating a prior art construction of the rotation preventing/thrust bearing device.
Figure 2:
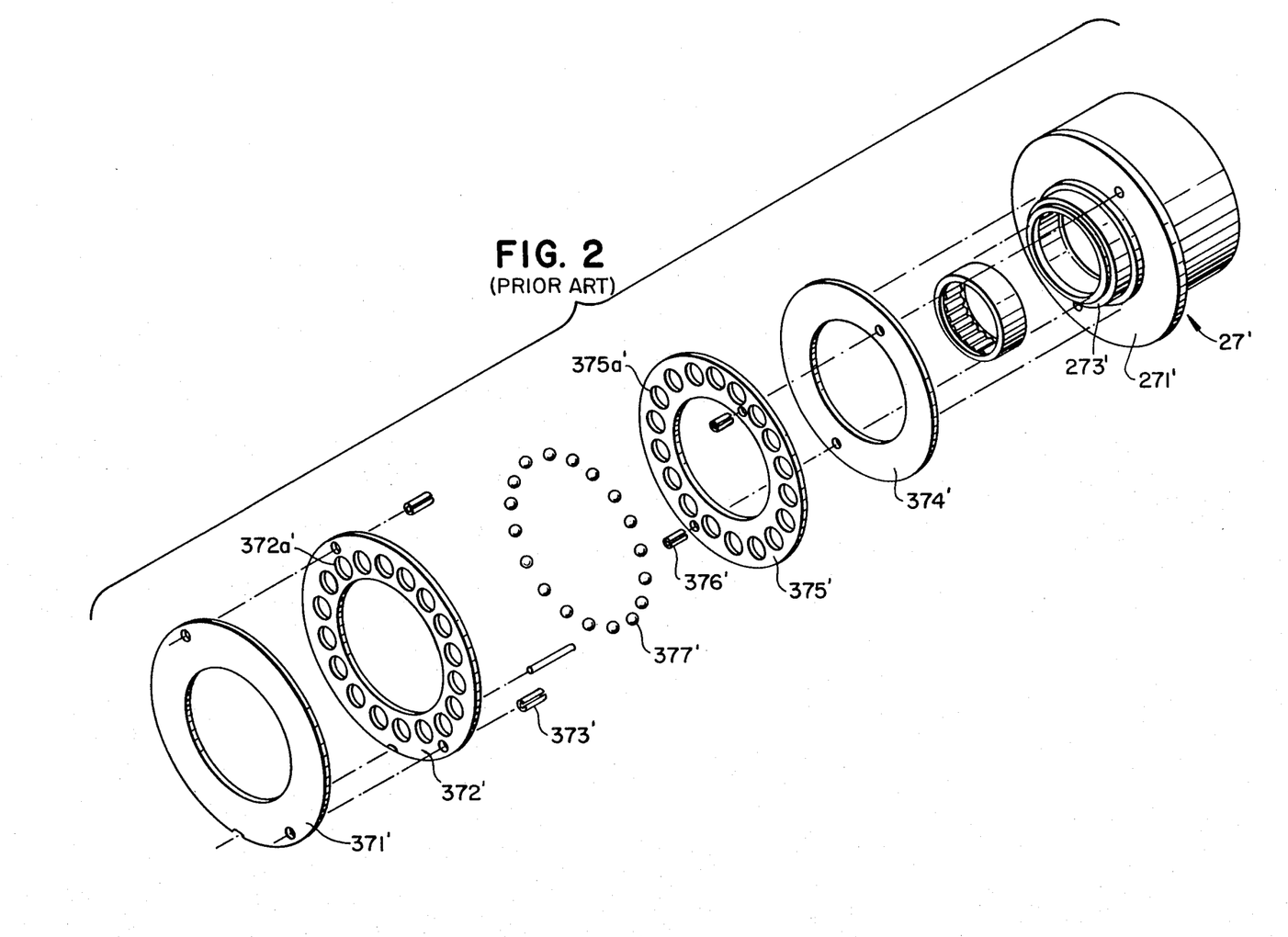
FIG. 2 is an exploded perspective view of the rotation preventing/thrust bearing device shown in FIG. 1.
Figure 3:
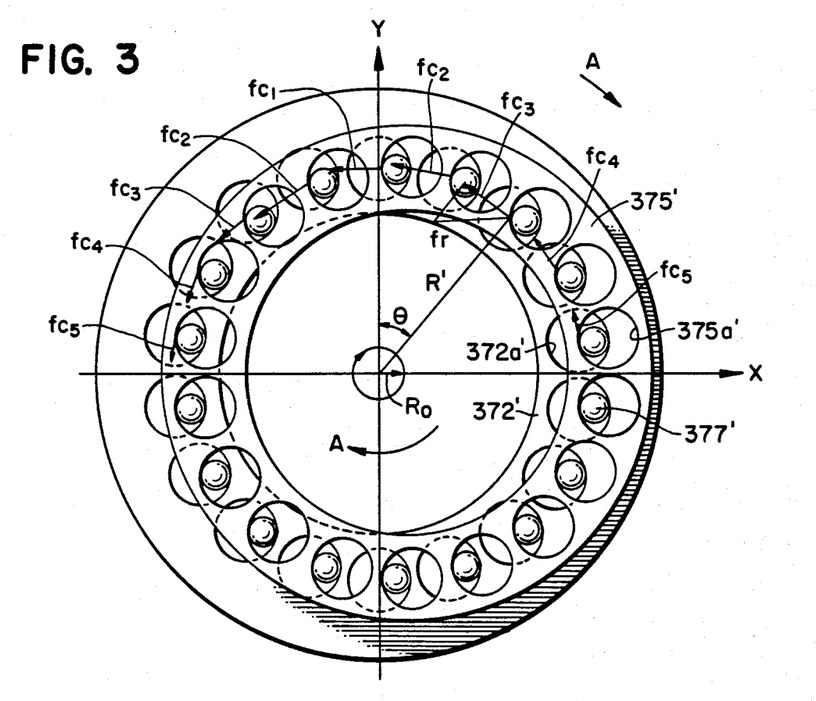
FIG. 3 is a diagrammatic front view of the rotation preventing/thrust bearing device of FIG. 1 illustrating the manner by which rotation is prevented.

Referring to FIGS. 1, 2 and 3, one solution to the above disadvantage will be described. FIG. 1 is a vertical sectional view of a part of a compressor and FIG. 2 is an exploded perspective view of a rotation preventing/thrust bearing device 37'. Rotation preventing/thrust bearing device 37' surrounds a boss 273' of orbiting scroll 27' and includes an orbital portion, a fixed portion and bearings, such as a plurality of balls. The fixed portion includes (1) an annular fixed race 371' having one end surface fitted against the axial end surface of annular projection 112' of front end plate 11', and (2) a fixed ring 372' fitted against the other axial end surface of fixed race 371' to extend outwardly therefrom and cover the other end surface of fixed race 371'. Fixed race 371' and ring 372' are attached to the axial end surface of annular projection 112' by pins 373'. The orbital portion also includes (1) an annular orbital race 374', which has one end surface fitted against an axial end surface of circular plate 271' and (2) an orbital ring 375' fitted against the other axial end surface of orbital race 374' to extend outwardly therefrom and cover the other axial end surface of orbital race 374'. A small clearance is maintained between the end surface of fixed ring 372' and the end surface of orbital ring 375'. Orbital race 374' and ring 375' are attached to the end surface of circular plate 271' by pins 376'.

Fixed ring 372' and orbital ring 375' each have a plurality of holes or pockets 372a' and 375a' in the axial direction, the number of holes or pockets in each ring 372', 375' being equal. Bearing elements, such as balls or spheres 377', are placed between facing generally aligned pairs of pockets 372a', 372b' of fixed and orbital rings 372', 375', with the rings 372', 375' facing one another at a predetermined clearance.

Referring to FIG. 3, the operation of the rotation preventing/thrust bearing device 37' will be described. In FIG. 3 the center of orbital ring 375' is placed at the right side and the direction of rotation of the drive shaft is clockwise as indicated by arrow A. When orbiting scroll 27' is driven by the rotation of the drive shaft, the center of orbital ring 375' orbits about a circle of radius $R_o$ (together with orbiting scroll 27'). However, a rotating force, i.e., moment, which is caused by the offset of the acting point of the reaction force of compression and the acting point of drive force, acts on orbiting scroll 27'. This reaction force tends to rotate orbiting scroll 27' in a clockwise direction about the center of orbital ring 375'. But, as shown in FIG. 3, eighteen balls 377' are placed between the corresponding pockets 372a' and 375a' of rings 372' and 375'. In the position shown in FIG. 3, the interaction between the nine balls 377' at the top of the rotation preventing/thrust bearing device and the edges of the pockets 372a' and 375a' prevents the rotation of orbiting scroll 27'. The magnitude of the rotation preventing forces are shown as $fc_1$–$fc_5$ in FIG. 3.

In the construction, as described above, the rotation preventing/thrust bearing device 37' is made up of a pair of races and a pair of rings, with each race and ring formed separately. Therefore, the parts of the rotation preventing/thrust bearing device are easy to construct and the most suitable material for each part can be selected. However, each ring is attached by pins. The rotation preventing force of the rings is thus transmitted to the attachment pins. Since the location at which the rotation preventing force of the rings act on the respective attachment pins is spaced from the location at which the pins are attached to the orbiting scroll or housing, a moment is generated which acts on the pins. If both an associated ring and race are attached by a respective pin, this spacing increases, with the result that the stress on the pin also is increased. Also, stress is placed on the attachment pins by the impact load which occurs when the compressor unit is driven at high speed. Because of these factors, it is desirable to reduce the stress in the attachment pins.

SUMMARY OF THE INVENTION

It is a primary object of this invention to provide an improved rotation preventing/thrust bearing means device for an orbiting member fluid displacement apparatus.

It is another object of this invention to provide an orbiting member fluid displacement apparatus which is reduced in weight.

It is still another object of this invention to provide an orbiting member fluid displacement apparatus which is simple in construction and can be simply and reliably manufactured.

An orbiting member fluid displacement apparatus according to this invention includes a housing. A fixed member is attached to the housing and has first end plate from which a fixed fluid displacement member extends into the interior of the housing. An orbiting member has second end plate from which an orbiting fluid displacement member extends. The fixed and orbiting fluid displacement members interfit at a radial offset to make a line contact to separate a fluid inlet from a fluid outlet. A driving mechanism including a drive shaft, which is rotatably supported by the housing is connected to the orbiting fluid displacement member to effect the orbital motion of the orbiting fluid displacement member.

A rotation preventing/thrust bearing device is connected to the orbiting fluid displacement member for preventing the rotation of the orbiting fluid displacement member during orbital motion so that the fluid pocket changes volume during the orbital motion of the orbiting fluid displacement member.

The rotation preventing/thrust bearing device comprises an orbital portion, a fixed portion and a plurality of bearings such as balls or spheres. The orbital portion includes an annular race and ring, both of which are formed separately. The race is placed within an annular groove formed on the end surface of the end plate opposite to the side from which the orbiting member extends. The ring is attached to the end surface of end plate to cover the race and has a plurality of pockets formed in a axial direction toward the race. The fixed portion includes a second annular race and a second ring, both of which are formed separately. The second race is placed within an annular groove formed on an inner surface of the housing. The second ring is attached to the inner surface of the housing to cover the second race and has a plurality of second pockets formed in an axial direction toward the second race. A clearance is maintained between the ring of the orbital portion and the ring of the fixed portion. The bearings are placed between facing generally aligned first and second pockets of the rings. The rotation of the orbiting member is thus prevented by the bearings which are placed in the pockets of both rings and the thrust load from the orbiting member is supported by the race of fixed portion through the bearings.

Further objects, features and other aspects of this invention will be understood from the following detailed description of preferred embodiments of this invention, referring to the annexed drawings.

DETAILED DESCRIPTION OF THE INVENTION

Figure 4:
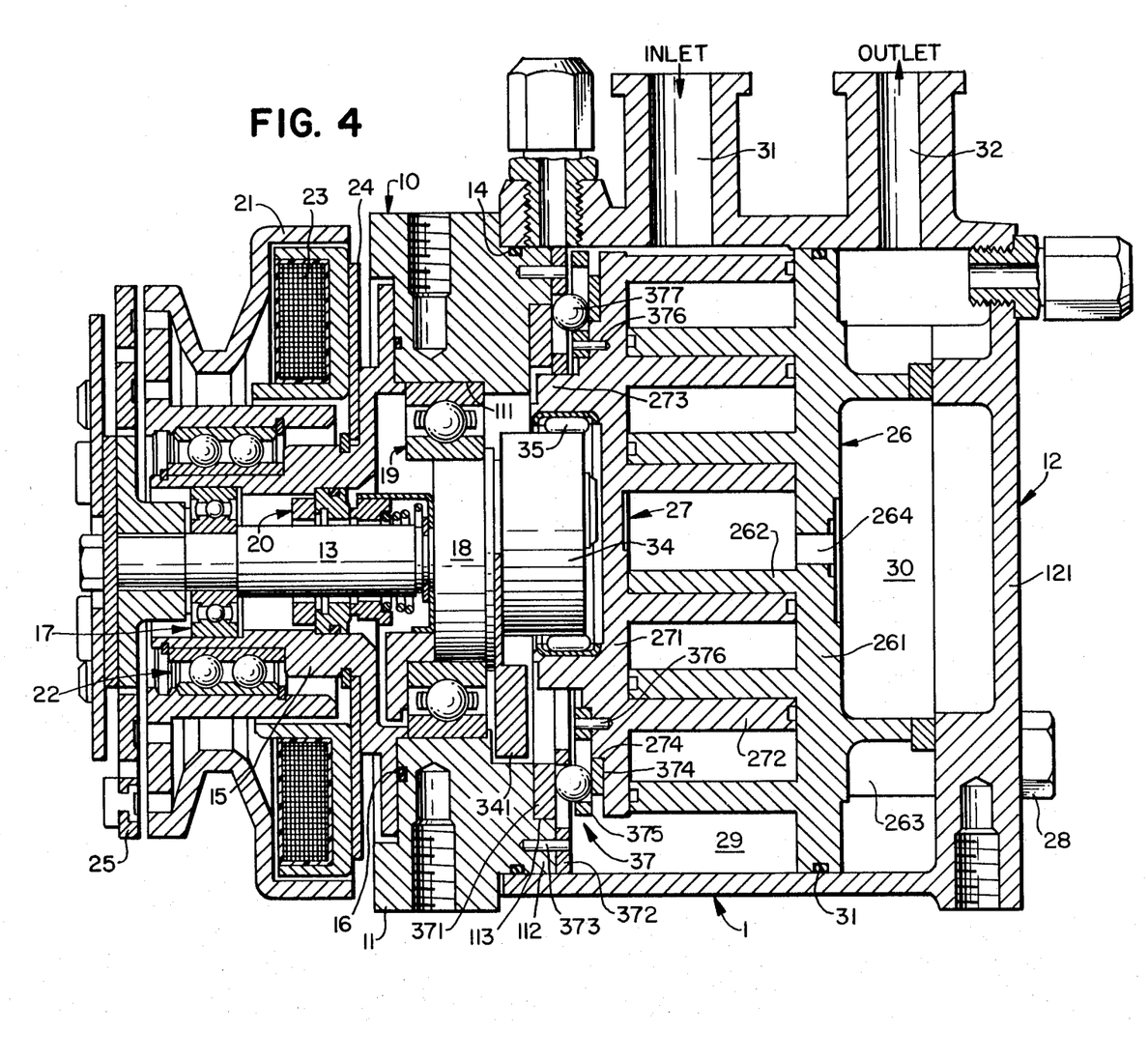
FIG. 4 is a vertical sectional view of a compressor unit according to one embodiment of this invention.

Referring to FIG. 4, an embodiment of a fluid displacement apparatus in accordance with the present invention, in particular a scroll type refrigerant compressor unit 1 is shown. The compressor unit 1 includes a compressor housing 10 having a front end plate 11 and a cup shaped casing 12 which is attached to an end surface of front end plate 11. An opening 111 is formed in the center of front end plate 11 for the penetration or passage of a drive shaft 13. An annular projection 112 is formed in a rear end surface of front end plate 11. Annular projection 112 faces cup shaped casing 12 and is concentric with opening 111. An outer peripheral surface of annular projection 112 extends into an inner wall of the opening of cup shaped casing 12. Cup shaped casing 12 is fixed on the rear end surface of front end plate 11 by a fastening device, for example, bolts and nuts. The opening portion of cup shaped casing 12 is thus covered by front end plate 11. An O-ring 14 is placed between the outer peripheral surface of annular projection 112 and the inner wall of the opening of cup shaped casing 12, to seal the mating surfaces of front end plate 11 and cup shaped casing 12. Front end plate 11 has an annular sleeve 15 projecting from the front end surface thereof which surrounds drive shaft 13 and defines a shaft seal cavity. In the embodiment shown in FIG. 4, sleeve 15 is separate from front end plate 11. Therefore, sleeve 15 is fixed to the front end surface of front end plate 11 by screws (not shown). An O-ring 16 is placed between the end surface of front end plate 11 and an end surface of sleeve 15 to seal fitting surface of front end plate 11 and sleeve 15. Alternatively, sleeve 15 may be integral with front end plate 11.

Drive shaft 13 is rotatably supported by sleeve 15 through a bearing device 17 located within the front end of sleeve 15. Drive shaft 13 has a disk 18 at its inner end which is rotatably supported by front end plate 11 through a bearing device 19 located within opening 111 of front end plate 11. A shaft seal assembly 20 is coupled to drive shaft 13 within the shaft seal cavity of sleeve 15.

A pulley 21 is rotatably supported by a bearing assembly 22 which is carried on the outer surface of sleeve 15. An electromagnetic coil 23 is fixed about the outer surface of sleeve 15 by a support plate 24 and is received in an annular cavity of pulley 21. An armature plate 25 is elastically supported on the outer end of drive shaft 13 which extends from sleeve 15. A magnetic clutch thus includes pulley 21, magnetic coil 23 and armature plate 25. In operation, drive shaft 13 is driven by an external drive power source, for example, a vehicle engine, through a rotation force transmitting device such as the above described magnetic clutch.

A fixed scroll (fixed member) 26, an orbiting scroll (orbiting member) 27, a driving mechanism for orbiting scroll 27 and a rotation preventing/thrust bearing device for orbiting scroll 27 are located within an inner chamber of cup shaped casing 12. The inner chamber is formed between the inner wall of cup shaped casing 12 and front end plate 11.

Fixed scroll 26 includes a circular end plate 261, a wrap or spiral element (fixed fluid displacement member) 262 affixed to or extending from one side surface of circular end plate 261, and a plurality of internally threaded bosses 263 axially projecting from the other end surface of circular plate 261. An end surface of each boss 263 is seated on the inner surface of an end plate 121 of cup shaped casing 12 and is fixed to end plate 121 by bolts 28. Fixed scroll 26 is thus fixed within cup shaped casing 12. Circular end plate 261 of fixed scroll 26 divides the inner chamber of cup shaped casing 12 into a discharge chamber 30 and a suction chamber 29 with a seal ring 31 placed between the outer peripheral surface of circular plate 261 and the inner wall of cup shaped casing 12. A hole or discharge port 264 is formed through circular plate 261 at a position near the center of spiral element 262; discharge port 264 is connected between the fluid pocket of the spiral element 262 and discharge chamber 30.

Orbiting scroll 27 also includes a circular end plate 271 and a wrap or spiral element (orbiting fluid displacement member) 272 affixed to or extending from one side surface of circular end plate 271. Spiral element 272 and spiral element 262 of fixed scroll 26 interfit at angular offset of 180° and a predetermined radial offset. At least a pair of fluid pockets are thereby defined between both spiral elements 262 and 272. Orbiting scroll 27 which is connected to the drive mechanism and to the rotation preventing/thrust bearing device, is driven in an orbital motion at a circular radius $R_o$ by rotation of drive shaft 13 to thereby compress fluid passing through the compressor unit. Generally, radius $R_o$ of orbital motion given by the following formula:

$$R_o = \frac{\text{(pitch of spiral element)} - 2(\text{wall thickness of spiral element})}{2}$$

Figure 8:
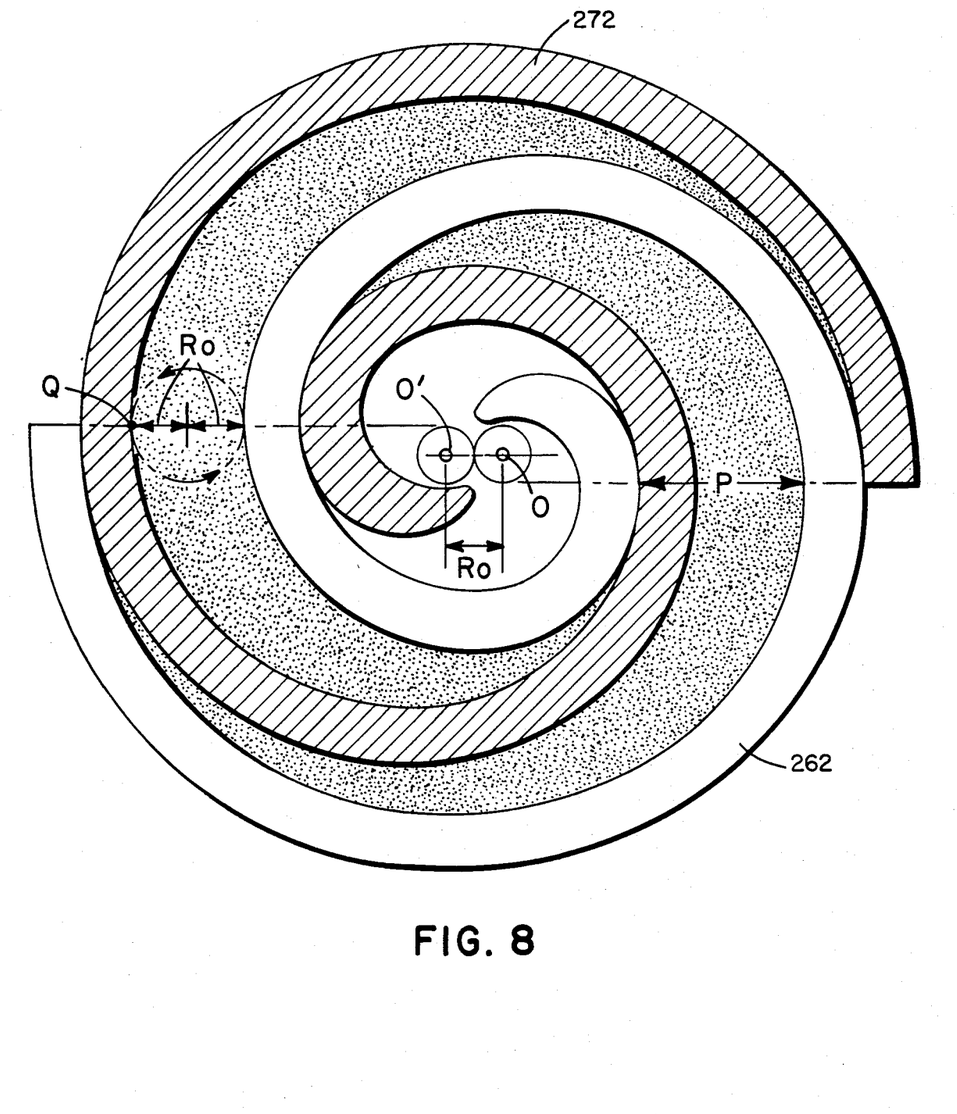
FIG. 8 is a diagrammtic sectional view illustrating the spiral elements of the fixed and orbiting scroll members.

As shown in FIG. 8, the pitch (p) of the spiral elements can be defined by $2\pi rg$, where rg is the involute generating circle radius. The radius of orbital motion $R_o$ is also illustrated in FIG. 8 as the locus of an arbitrary point Q on wrap 272 of orbiting scroll 27. The spiral element 272 is radially offset from spiral element 262 of fixed scroll 26 by the distance $R_o$. Thus, orbiting scroll 27 undergoes orbital motion of a radius $R_o$ upon rotation of drive shaft 13. As the orbiting scroll 27 orbits, the line contacts between both spiral element 262 and 272 moves toward the center of the spiral elements along the surfaces of the spiral elements. Fluid pockets, which are defined between spiral elements 262 and 272, also move to the center with a consequent reduction in volume and compression of the fluid in the fluid pockets. The fluid or refrigerant gas, which is introduced into suction chamber 29 from an external fluid circuit through an inlet port 31, is taken into fluid pockets formed between spiral elements 262 and 272 from the outer end portions of the spiral elements. As orbiting scroll 27 orbits, fluid in the fluid pockets is compressed and the compressed fluid is discharged into discharge chamber 30 from the central fluid pocket of the spiral element through hole 264. The fluid then is discharged to the external fluid circuit through an outlet port 32.

Figure 5:
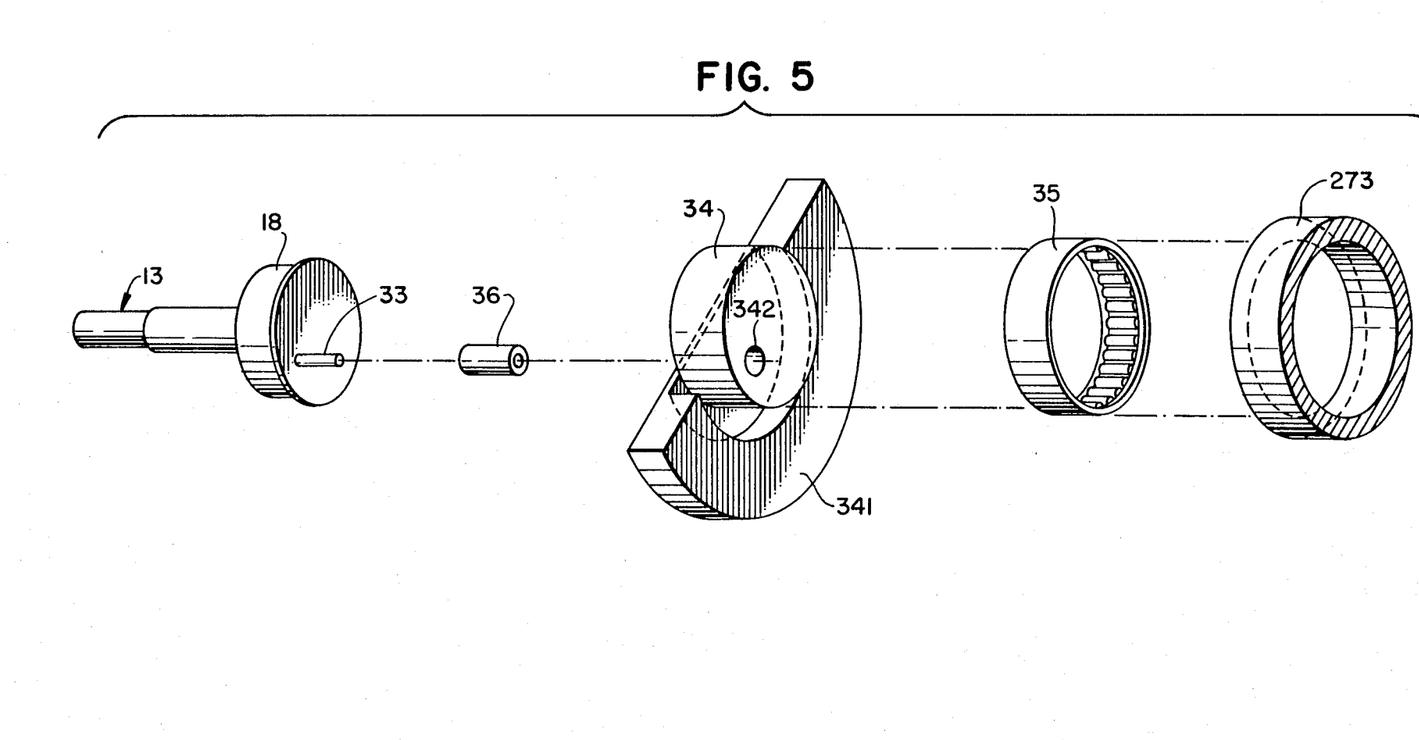
FIG. 5 is an exploded perspective view of the driving mechanism in the embodiment of FIG. 4.

Referring again to FIGS. 4 and 5, the driving mechanism of orbiting scroll 27 will be described in greater detail. Drive shaft 13, which is rotatably supported by sleeve 15 through bearing device 17, is connected to disk 18. Disk 18 is rotatably supported by front end plate 11 through bearing device 19 located within opening 111 of front end plate 11. A crank pin or drive pin 33 projects axially from an axial end surface of disk 18 at a position which is radially offset from the center of drive shaft 13. Circular end plate 271 of orbiting scroll 27 has a tubular boss 273 axially projecting from the end surface opposite the surface from which spiral element 272 extends. A discoid or short axial bushing 34 fits into boss 273 and is rotatably supported therein by a bearing such as a needle bearing 35. Bushing 34 has a balance weight 341, which has the shape of a portion of a disk or ring and extends radially from bushing 34 along a front surface thereof. An eccentric hole 342 is formed in bushing 34 at a position radially offset from center of bushing 34. Drive pin 33 fits into the eccentrically disposed hole 342 together with a bearing 36. Bushing 34 is therefore driven in an orbital path by the revolution of drive pin 33 and rotates within needle bearing 35.

Now, the rotation of orbiting scroll 27 is prevented by a rotation preventing/thrust bearing 37 which is located between the inner surface of housing 10 and circular plate 271 of orbiting scroll 27. As a result, orbiting scroll 27 orbits while maintaining its angular orientation relative to the fixed scroll 26.

Rotation preventing/thrust bearing device 37 surrounds boss 273 of orbiting scroll 27 and includes an orbital portion, a fixed portion and bearings, such as a plurality of balls. The fixed portion includes (1) an annular fixed race 371 which is placed within a groove 113 formed in the axial end surface of annular projection 112 of front end plate 11, and (2) a fixed ring 372 fitted against the axial end surface of annular projection 112 of front end plate 11 to cover the end surface of fixed race 371. Fixed ring 372 is attached to the axial end surface of annular projection 112 by pins 373, and fixed race 371 is fixed in groove 113 by fitting, i.e., a friction fit. The orbital portion also includes (1) an annular orbital race 374, which is placed within a groove 274 formed in the axial end surface of circular plate 271 of orbiting scroll 27 and (2) an orbital ring 375 fitted against the axial end surface of circular end plate 271 of orbiting scroll 27 to cover the axial end surface of orbital race 374. A small clearance is maintained between the end surface of fixed ring 372 and the end surface of orbital ring 375. Orbital ring 375 is attached to the end surface of circular plate 271 by pins 376, and orbital race 374 is fixed in groove 274 by fitting.

Fixed ring 372 and orbital ring 375 each have a plurality of holes or pockets 372a and 375a in the axial direction, the number of holes or pockets in each ring 372, 375 being equal. The holes or pockets 372a and fixed ring 372 correspond to or are a mirror image of the holes or pockets 375a on the orbit ring 375, i.e., each pair of pockets facing each other have the same size and pitch, and the radial distance of the pockets from the center of their respective rings 372 and 375 is the same, i.e., the centers of the pockets are located the same distance from the center of the rings 372 and 375. Thus, if the centers of the rings 372 and 375 were aligned, which they are not in actual operation of the rotation preventing/thrust bearing device 37, the holes or pockets 372a and 375a would be identical or in alignment. Bearing elements, such as balls or spheres 377, are placed between the edge of pocket 372a of fixed ring 372 and the edge of a facing, generally aligned pocket 375a of orbital ring 375. Therefore, the rotation of orbiting scroll 27 is prevented by balls 377, which interact with the edges of pockets 372a and 375a to prevent rotation. Also, these balls 377 carry the axial thrust load from orbiting scroll 27.

In this embodiment of device 37, the distance between the supporting point of the pins and the acting point of the rotation preventing force is reduced since the pin only has to penetrate the ring, rather than both the ring and the race. The stress on the supporting point of the pins is thereby reduced and likelihood of breakage of the attachment pins is reduced. Groove 274 does not extend radially inward as far as the radially innermost edge of ring 375, so that the width, i.e, the distance between the inner and outer diameters of race 374 can be kept small. Similarly, groove 113 does not extend radially outward as far as the radially outward most edge of ring 372, so that the width of race 371 can be kept small. Thus, this embodiment of rotation preventing/thrust bearing devices both reduces stress on the attachment pins and reduces the weight of the races.

In this type of rotation preventing/thrust bearing device, rotation prevention is more effective if the distance between the contact point of the ball and the edge of the pockets and the end surface of the race is larger, i.e., the contact point of the ball and the edge of pockets is placed close to a center line passing through the center of the ball and parallel to the end surfaces of the rings.

Figure 6:
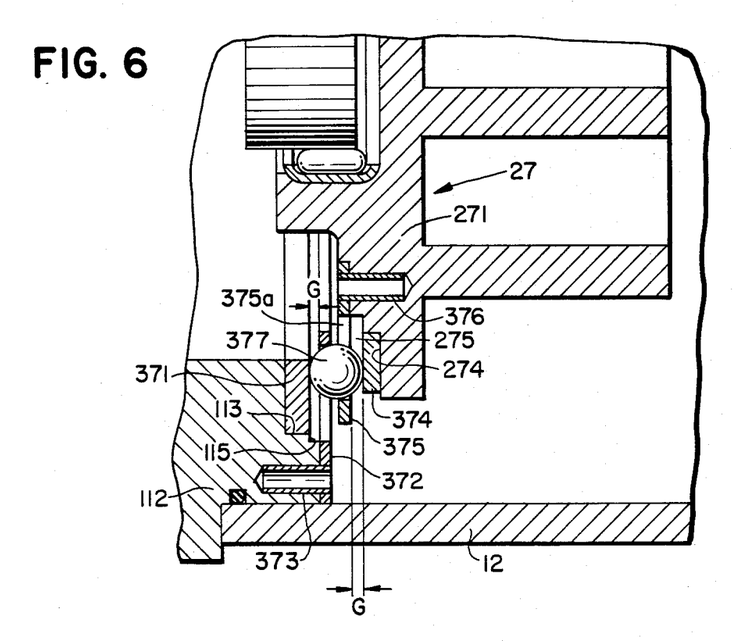
FIG. 6 is a vertical section view of a part of a compressor according to still another embodiment of this invention.

Referring to FIG. 6, still another embodiment of this invention is shown, illustrating a modification of the construction for fixing the rings to improve rotation preventing. In this embodiment, the thickness of rings 372 and 375 is reduced so that a thinner portion of the rings bears the attachment force of pins 373 and 376. The rings 372 and 375 are attached to the outermost surfaces of annular projection 112 and circular plate 271 by fasteners 373 and 376, respectively. These outermost surfaces are located as close to one another as possible in order to place the thinner rings 372 and 375 as close as possible to the center line of balls 377 while still maintaining a clearance between the rings.

A first groove 113 and a second groove 115 are formed in the end surface of annular projection 112. First groove 113 is radially innermost and deepest. Fixed race 371 is carried in groove 113 and has an axial end surface flush with the axial end surface of second groove 115. The depth of second groove 115 defines a clearance (G) between fixed race 371 and fixed ring 372. Similarly, a first groove 274 and a second groove 275 are formed in the end surface of circular plate 271. First groove 274 is radially outermost and deepest. Orbital race 374 is carried in groove 274 and has an axial end surface flush with the axial end surface of second groove 275. The depth of second groove 275 defines a clearance (G) between orbital race 374 and orbital ring 375.

In the embodiment of rotation preventing/thrust bearing device 37 of FIG. 6, the rotation preventing function is optimized by placing rings 372 and 375 as close as possible to the center line of balls 377, while at the same time reducing the weight of device 37 by making the rings 372 and 375 thin and keeping the width of races 371 and 374 small.

Figure 7:
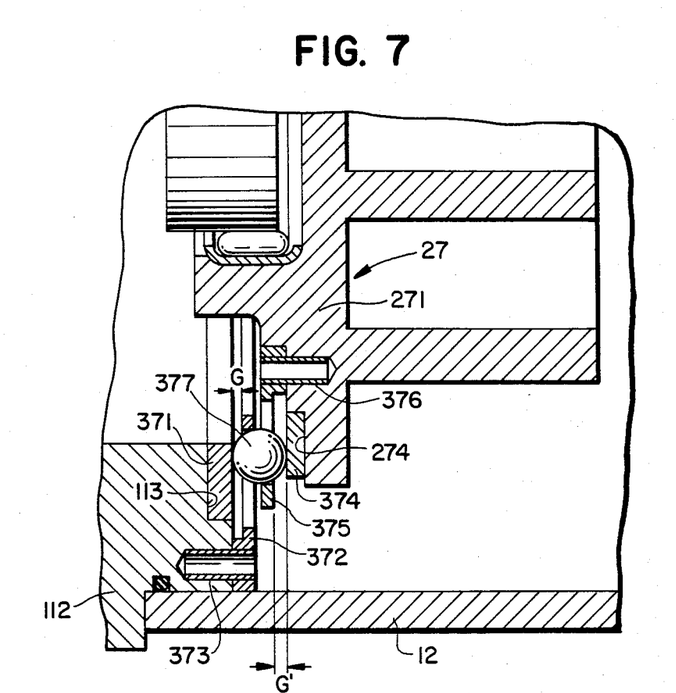
FIG. 7 is a vertical section view of a part of a modification of the embodiment in FIG. 6.

FIG. 7 illustrates a modification of the ring construction shown in FIG. 6. Only a single groove 113 is formed in annular projection 112, and only a single groove 274 is formed in the end surface of circular plate 271. Fixed race 371 is supported in groove 113 and orbital race 374 is supported in groove 274. Fixed ring 372 has a thin radially inner portion and a thick radially outer portion. Pockets 372a are formed in the thin portion and the thick portion is placed in contact with the end surface of annular projection 112. Fasteners 373 penetrate the thick portion of fixed ring 372 and attached it to projection 112. A clearance (G) is defined between the end surface fixed race 371, which is flush with the end surface of projection 112, and the axial surface of the thin portion of fixed ring 372 which faces race 371.

Similarly, orbital ring 375 has a thin radially outer portion and a thick radially inner portion. Pockets 375a are formed in the thin portion and the thick portion is placed in contact with the end surface of circular plate 271. Fasteners 376 penetrate the thick portion of ring 375 and attach it to plate 271. A clearance (G) is defined between the end surface of orbital race 374, which is flush with the end surface of plate 271, and the axial surface of the thin portion of orbital ring 375 which faces race 374.

The rotation preventing/thrust bearing device 37 of FIG. 7 also optimizes the rotation preventing function by placing rings 372 and 375 as close as possible to the center line of balls 377, while at the same time reducing the weight of the device by making a portion of rings 372 and 375 thin and keeping the width of races 371 and 374 small.

This invention has been described in detail in connection with preferred embodiments, which are only for exemplification. It will be understood by those skilled in the art that modifications to the described embodiments are possible without departing from the scope of this invention.

We claim:

1. In an orbiting member fluid displacement apparatus including a housing, a fixed member attached to or integral with said housing, an orbiting member having an end plate from which an orbiting fluid displacement member extends, said fixed member and orbiting fluid displacement member interfitting at a radial offset to make a line contact to separate a fluid outlet from a fluid inlet and a driving mechanism including a rotatable drive shaft connected to said orbiting member to drive said orbiting member in an orbital motion, rotation preventing/thrust bearing means connected to said orbiting member for preventing the rotation of said orbiting member and for carrying axial thrust load from said orbital member during orbital motion so that the line contact moves toward a discharge opening, said rotation preventing/thrust bearing means being comprised of a discrete orbital portion, a discrete fixed portion and bearing elements coupled between said portions, a center line extending through the center of said bearing elements, said orbital portion including an orbital annular race and an orbital ring, said orbital annular race being placed within an annular groove formed in said end plate on an opposite side from which said orbiting fluid displacement member extends, said annular groove in said end plate having an axial end surface spaced from the center line, said orbital ring being attached to said end plate to cover said orbital race, said orbital ring being in contact with a contact surface of said end plate spaced from the center line, the spacing between the center line and said contact surface being less than the spacing between the center line and said axial end surface, said orbital ring having a plurality of first pockets extending axially toward said orbital race, said fixed portion including a fixed annular race and a fixed ring, said fixed annular race being placed within an annular groove formed in said housing, said annular groove in said housing having an axial end surface spaced from the center line, said fixed ring being attached to said housing to cover said fixed race and facing said orbital ring, said fixed ring being in contact with a contact surface of said housing spaced from the center line, the spacing between the center line and said last-mentioned contact surface being less than the spacing between the center line and said last-mentioned axial end surface, said fixed ring having a plurality of second pockets extending axially toward said fixed race, said bearing elements each being carried within a generally aligned pair of said first and second pockets and contacting said orbital and fixed races to prevent the rotation of said orbiting member by said bearing elements interacting with said orbital and fixed rings and to carry the axial thrust load from said orbiting member on said fixed race through said bearing elements.

2. In a scroll type fluid displacement apparatus including a housing, a fixed scroll attached to said housing and having a first end plate from which a first wrap extends into said housing, an orbiting scroll having a second end plate from which a second wrap extends, said first and second wraps interfitting at an angular and radial offset to make a plurality of line contacts to define at least one pair of sealed off fluid pockets and a driving mechanism including a rotatable drive shaft connected to said orbiting scroll to drive said orbiting scroll in an orbital motion, rotation preventing/thrust bearing means connected to said orbiting scroll for preventing the rotation of said orbiting scroll and for carrying axial thrust load from said orbital scroll during orbital motion so that the volume of said fluid pockets change, said rotation preventing/thrust bearing means being comprised of a discrete orbital portion, a discrete fixed portion and bearing elements coupled between said portions, a center line extending through the center of said bearing elements, said orbital portion including an orbital annular race and an orbital ring, said orbital annular race being placed within an annular groove formed in said second end plate on an opposite side from which said second wrap extends, said annular groove in said second end plate having an axial end surface spaced from the center line, said orbital ring being attached to said second end plate to cover said orbital race, said orbital ring being in contact with a contact surface of said second end plate spaced from the center line, the spacing between the center line and said contact surface being less than the spacing between the center line and said axial end surface, said orbital ring having a plurality of first pockets extending axially toward said orbital race and formed separately from said orbital race, said fixed portion including a fixed annular race and a fixed ring, said fixed annular race being placed within an annular groove formed in said housing, said annular groove in said housing having an axial end surface spaced from the center line, said fixed ring being attached to said housing to cover said fixed race and facing said orbital ring, said fixed ring being in contact with a contact surface of said housing spaced from the center line, the spacing between the center line and said last-mentioned contact surface being less than the spacing between the center line and said last-mentioned axial end surface, said fixed ring having a plurality of second pockets extending axially toward said fixed race and formed separately from said fixed race, said bearing elements each being carried within a generally aligned pair of said first and second pockets and contacting said orbital and fixed races to prevent the rotation of said orbiting scroll by said bearing elements interacting with said orbital and fixed rings and to carry the axial thrust load from said orbiting scroll on said fixed race through said bearing elements.

3. The scroll type fluid displacement apparatus as claimed in claim 2, wherein said orbital ring is attached to the end surface of said second end plate by a plurality of fasteners and said fixed ring is attached to an inner surface of said housing by a plurality of fasteners.

4. The scroll type fluid displacement apparatus as claimed in claim 3 including means for maintaining a clearance between the orbital race and orbital ring, and between the fixed race and the fixed ring.

5. The scroll type fluid displacement apparatus as claimed in claim 4 wherein said means for maintaining a clearance includes said orbital ring having a thick portion and a thin portion, said thick portion being in contact with said end surface of said second end plate and said fasteners attaching said orbital ring penetrating said thick portion, the pockets in said orbital ring extending into the thin portion thereof, and said fixed ring having a thick portion and a thin portion, said thick portion being in contact with said inner surface of said housing, and said fasteners attaching said fixed ring penetrating said thick portion, the pockets in said fixed ring extending into the thin portion thereof, so that said thick portions of said rings define at least a part of each of said clearances.

6. The scroll type fluid displacement apparatus as claimed in claim 4 wherein said means for maintaining a clearance includes a second annular groove formed in said end surface of said second end plate, and a second annular groove formed in said inner surface of said housing, the depth of said second groove in said second end plate defining at least a part of the clearance between said orbital race and orbital ring, and the depth of said second groove in the inner surface of said housing defining at least a part of the clearance between said fixed race and fixed ring.

7. A scroll type fluid displacement apparatus comprising:
- a housing having a front end plate;
- a fixed scroll attached to said housing and having a first end plate from which a first wrap extends into an interior of said housing;
- an orbiting scroll having a second end plate from which a second wrap extends, said first and second wraps interfitting at an angular and radial offset to make a plurality of line contacts to define at least a pair of sealed off fluid pockets;
- a driving mechanism including a rotatable driveshaft connected to said orbiting scroll to drive said orbiting scroll in orbital motion;
- rotation preventing/thrust bearing means connected to said orbiting scroll for preventing the rotation of said orbiting scroll and for carrying the axial thrust of said orbiting scroll during its orbital motion; and
- said rotation preventing/thrust bearing means comprising a discrete orbital portion, a discrete fixed portion and bearing elements, a center line extending through the center of said bearing elements, said orbital portion including an orbital annular race and an orbital ring both of which are formed separately, said orbital annular race being placed within an annular groove formed in an end surface of said second end plate on an opposite side from which said second wrap extends, said annular groove in said second end plate having an axial end surface spaced from the center line, said orbital ring being attached to the end surface of said second end plate to cover said orbital race, said orbital ring being in contact with a contact surface of said second end plate spaced from the center line, the spacing between the center line and said contact surface being less than the spacing between the center line and said axial end surface, a plurality of pockets being formed in said orbital ring in an axial direction toward said orbital race, said fixed portion including a fixed annular race and a fixed ring both of which are formed separately, said fixed annular race being placed within an annular groove formed in an inner surface of said housing, said annular groove in said housing having an axial end surface spaced from the center line, said fixed ring being attached to the inner surface of said housing to cover said fixed race, said fixed ring being in contact with a contact surface of said housing spaced from the center line, the spacing between the center line and said last-mentioned contact surface being less than the spacing between the center line and said last-mentioned axial end surface, a plurality of pockets being formed in said fixed ring in an axial direction toward said fixed race, said pockets of said orbital and fixed rings facing one another in generally aligned pairs and having corresponding size, pitch and radial distance, said bearing elements each being carried within one of said generally aligned pairs of pockets and contacting said orbital and fixed races to prevent the rotation of said orbiting scroll by said bearing elements interacting with said orbital and fixed rings and to carry the axial thrust load from said orbiting scroll on said fixed race through said bearing elements.

* * * * *